US009423820B2

(12) United States Patent
Card

(10) Patent No.: US 9,423,820 B2
(45) Date of Patent: Aug. 23, 2016

(54) COMPLIMENTARY BIT SLICING SIDE CHANNEL ATTACK DEFENSE

(71) Applicant: Fairchild Semiconductor Corporation, San Jose, CA (US)

(72) Inventor: Robert A. Card, Scarborough, ME (US)

(73) Assignee: Fairchild Semiconductor Corporation, San Jose, CA (US)

(*) Notice: Subject to any disclaimer, the term of this patent is extended or adjusted under 35 U.S.C. 154(b) by 0 days.

(21) Appl. No.: 14/448,412

(22) Filed: Jul. 31, 2014

(65) Prior Publication Data

US 2015/0039911 A1      Feb. 5, 2015

Related U.S. Application Data

(60) Provisional application No. 61/860,584, filed on Jul. 31, 2013.

(51) Int. Cl.
| | | |
|---|---|---|
| *G06F 21/81* | (2013.01) | |
| *G06F 1/04* | (2006.01) | |
| *G06F 21/62* | (2013.01) | |

(Continued)

(52) U.S. Cl.
CPC ............... *G06F 1/04* (2013.01); *G06F 21/629* (2013.01); *G06F 21/85* (2013.01); *G09C 1/00* (2013.01); *H04L 9/003* (2013.01); *H04L 2209/04* (2013.01); *H04L 2209/08* (2013.01); *Y04S 40/24* (2013.01)

(58) Field of Classification Search
CPC .......... G06F 21/81; G06F 1/04; G06F 21/85; G06F 21/629; G06F 21/558; G06F 1/08; G06F 21/75; G06F 2217/78; G06F 2207/7219; G06F 2207/7261; H04L 9/003; H04L 2209/08; H04L 2209/04; H04L 2209/12; H04L 9/002; G09C 1/00
See application file for complete search history.

(56) References Cited

U.S. PATENT DOCUMENTS

| | | | |
|---|---|---|---|
| 5,150,368 | A | 9/1992 | Autruong et al. |
| 7,483,936 | B2 | 1/2009 | Janssen et al. |

(Continued)

FOREIGN PATENT DOCUMENTS

| | | |
|---|---|---|
| CN | 101334760 A | 12/2008 |
| CN | 101587460 A | 11/2009 |
| CN | 102136048 A | 7/2011 |

OTHER PUBLICATIONS

"Chinese Application Serial No. 201420058318.0, Office Action mailed May 21, 2014", w/English Translation, 5 pgs.

(Continued)

*Primary Examiner* — Catherine Thiaw
(74) *Attorney, Agent, or Firm* — Schwegman Lundberg & Woessner, P.A.

(57) ABSTRACT

This document discusses, among other things, systems and methods to communicate data over a data bus during a first period of a clock signal with a uniform power distribution, including providing a complimentary bit state of the data during a first portion of the first period of the clock signal and providing an actual bit state of the data during a second portion of the first period of the clock signal. In an example, the first period can include first, second, third, and fourth portions, and the systems and methods can include providing a complimentary bit state of the data during first and fourth portions of the first period of the clock signal and an actual bit state of the data during a second portion of the first period of the clock signal.

20 Claims, 6 Drawing Sheets

(51) Int. Cl.
*G06F 21/85* (2013.01)
*G09C 1/00* (2006.01)
*H04L 9/00* (2006.01)

(56) References Cited

U.S. PATENT DOCUMENTS

| | | | |
|---|---|---|---|
| 7,599,488 B2* | 10/2009 | Kocher | G06F 7/00 |
| | | | 381/1 |
| 8,085,768 B1 | 12/2011 | Hui et al. | |
| 2002/0091850 A1 | 7/2002 | Perholtz et al. | |
| 2003/0182327 A1 | 9/2003 | Ramanujam et al. | |
| 2006/0020825 A1 | 1/2006 | Grab | |
| 2006/0098795 A1 | 5/2006 | Choti et al. | |
| 2006/0177018 A1* | 8/2006 | Kobayashi | H03M 1/1255 |
| | | | 379/88.07 |
| 2008/0022041 A1 | 1/2008 | Nakajima | |
| 2008/0141340 A1* | 6/2008 | Ohyama | G06F 21/558 |
| | | | 726/2 |
| 2009/0024991 A1 | 1/2009 | Campbell et al. | |
| 2009/0070507 A1 | 3/2009 | Asano et al. | |
| 2010/0161151 A1 | 6/2010 | Yang et al. | |
| 2010/0299553 A1 | 11/2010 | Cen | |
| 2010/0325495 A1 | 12/2010 | Talla et al. | |
| 2011/0026655 A1* | 2/2011 | Crawley | H03B 23/00 |
| | | | 375/359 |
| 2011/0225651 A1 | 9/2011 | Villasenor et al. | |
| 2013/0139252 A1 | 5/2013 | Paranjape et al. | |
| 2013/0151842 A1* | 6/2013 | Yu | H04L 9/003 |
| | | | 713/150 |
| 2013/0191652 A1* | 7/2013 | Seok | G06F 21/558 |
| | | | 713/300 |
| 2013/0219482 A1* | 8/2013 | Brandt | H04L 65/607 |
| | | | 726/9 |
| 2014/0211937 A1* | 7/2014 | Coric | H04L 9/003 |
| | | | 380/28 |
| 2014/0219444 A1* | 8/2014 | Boehl | H04L 9/003 |
| | | | 380/46 |
| 2014/0223557 A1 | 8/2014 | Card et al. | |

OTHER PUBLICATIONS

"Chinese Application Serial No. 201420058318.0, Response filed Aug. 5, 2014 to Office Action mailed May 21, 2014", w/English Claims, 12 pgs.

"U.S. Appl. No. 14/174,536, Examiner Interview Summary mailed Jun. 8, 2015", 3 pgs.

"U.S. Appl. No. 14/174,536, Non Final Office Action mailed May 1, 2015", 14 pgs.

"U.S. Appl. No. 14/174,536, Response filed Jun. 25, 2015 to Non Final Office Action mailed May 1, 2015", 11 pgs.

Chinese Application Serial No. 201410045113.3, Office Action mailed May 26, 2016, 7 pgs.

* cited by examiner

COMPLIMENTARY BIT SLICING SIDE CHANNEL ATTACK DEFENSE

CLAIM OF PRIORITY

This application claims the benefit of priority under 35 U.S.C. §119(e) of U.S. Provisional Patent Application Ser. No. 61/860,584, titled "SIDE CHANNEL ATTACK DEFENSE WITH COMPLIMENTARY BIT SLICING," filed on Jul. 31, 2013, which is incorporated by reference herein in its entirety.

BACKGROUND

As electronic data exchange has developed, so to have techniques to gain and defend against unauthorized access to data or electronic systems. For example, encrypted data transfer between different components in an electronic system can be used to prevent unauthorized access to one or more electronic system components.

FIG. 1 illustrates generally an example cryptographic engine 110 including a power management module 111, an inter-integrated circuit (I2C) bus 112, a non-volatile memory (NVM) 113, an NVM interface 114, an NVM control module 115, and a state machine 116. As used herein, engines, modules, and state machines can include hardware (e.g., circuits, etc.), software, firmware, or combinations thereof.

The cryptographic engine 110 can be configured to send or receive encrypted or unencrypted random numbers to or from one or more other electronic components (e.g., one or more other circuits, systems, cryptographic engines, etc.), for example, to authenticate one or more electronic components, to securely transfer data between electronic components, or to otherwise prevent unauthorized access to one or more electronic system components.

FIG. 2 illustrates generally an example master-slave system 100, including a master 101 configured to authenticate a slave 102, such as to reduce the risk of fraud, piracy, or counterfeit prior to communication.

In an example authentication routine, the master 101 can request a first of a plurality manufacturer ID's from one or more slaves (e.g., the slave 102). In response, the slave 102 can send a first manufacturer ID 103 back to the master 101. The master 101 can check the manufacturer ID 103. If the manufacturer ID 103 is revoked, the master 101 can request additional manufacturer IDs from the slave 102. If all manufacturer IDs are revoked, the master 101 can terminate the communication channel. Once a manufacturer ID 103 is confirmed, the master 101 can generate a true random number 104 and send it to the slave 102.

The slave 102 can encrypt the random number 104 using the slave key 105 of the confirmed manufacturer ID 103 and return the encrypted random number to the master 101. The master can derive the slave key 105 using its master key 106 and the confirmed manufacturer ID 103, encrypt the random number 104 sent to the slave 102 using the derived slave key 107, and can compare the encrypted random number to the encrypted random number received from the slave 102. If the encrypted random numbers match, the slave 102 is proven to contain a valid slave key 105 and communication between the master 101 and the slave 102 continue. If the encrypted random numbers do not match, the slave 102 is considered to be invalid and the communication channel can be terminated.

In certain examples, the master 101 can identify the type of slave 102 by, for example, identifying a resistance on an ID pin coupled to an interface (not shown) of the master 101. After identifying the type of slave 102, authentication can proceed to, for example, assure that the slave 102 is not a counterfeit, or has not accessed the master 101 by some type of fraud or piracy. In other examples, the slave 102 can be configured to authenticate the master 101.

However, as technology has developed, even sophisticated encryption techniques have become vulnerable to attack. Power analysis (e.g., simple power analysis (SPA), differential power analysis (DPA), etc.) and electromagnetic (EM) analysis are examples of side-channel attacks that extract cryptographic keys or other secret information from an electronic device (e.g., between components of an integrated circuit, etc.). Power analysis is based on the principle that an electronic circuit or system will consume different amounts of energy depending on the function it is performing. EM analysis is similar to power analysis, though it requires no physical contact with the electronic system. An attack can capture power consumption data during operation of a circuit or system, and such data can be analyzed to identify cryptographic algorithms. Once a cryptographic algorithm is identified, the data can be analyzed to identify one or more encryption keys. Once the attack has identified one or more encryption keys, the circuit or system is no longer secure.

Various techniques have developed to defend against such attacks, such as power line conditioning or filtering, adding noise to system (e.g., altering clock frequencies, etc.), using a constant-weight code, etc. One such countermeasure is disclosed in Frizke, "Obfuscating Against Side-Channel Power Analysis Using Hiding Techniques for AES" (herein, "Frizke"). Frizke requires dual algorithms to process both data and inverse data to balance the varying power consumption on the transistor level when evaluating a "0" or a "1". However, this countermeasure requires double the area and power consumption of a typical cryptographic system.

Overview

This document discusses, among other things, systems and methods to communicate data over a data bus during a first period of a clock signal with a uniform power distribution, including providing a complimentary bit state of the data during a first portion of the first period of the clock signal and providing an actual bit state of the data during a second portion of the first period of the clock signal. In an example, the first period can include first, second, third, and fourth portions, and the systems and methods can include providing a complimentary bit state of the data during first and fourth portions of the first period of the clock signal and an actual bit state of the data during a second portion of the first period of the clock signal.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized systems and methods to defend against side-channel attacks using complimentary bit slicing to provide a uniform power distribution on the data bus, reducing discriminating power profile information and concealing the activities of a circuit or electronic system.

Figure 1:
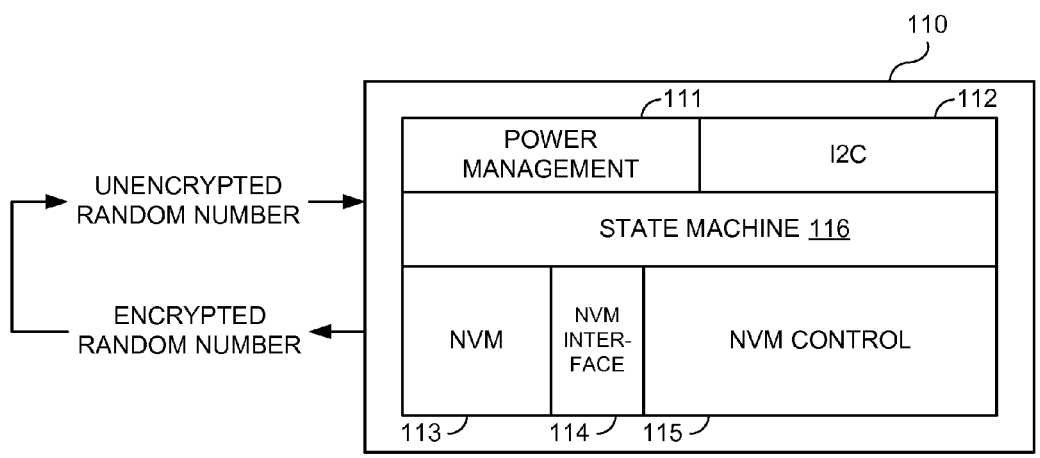
FIG. 1 illustrates generally an example cryptographic engine.
Figure 2:
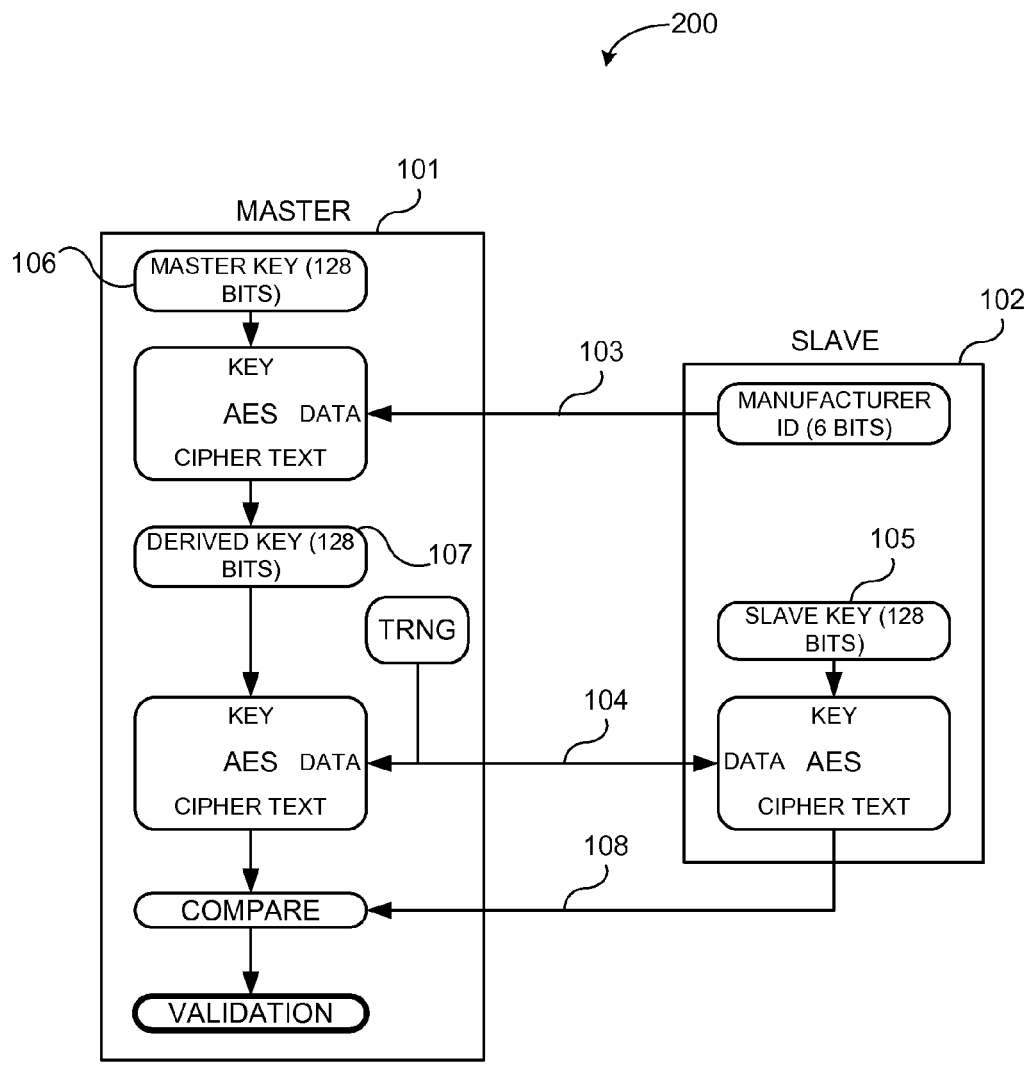
FIG. 2 illustrates generally an example master slave system.
Figure 3:
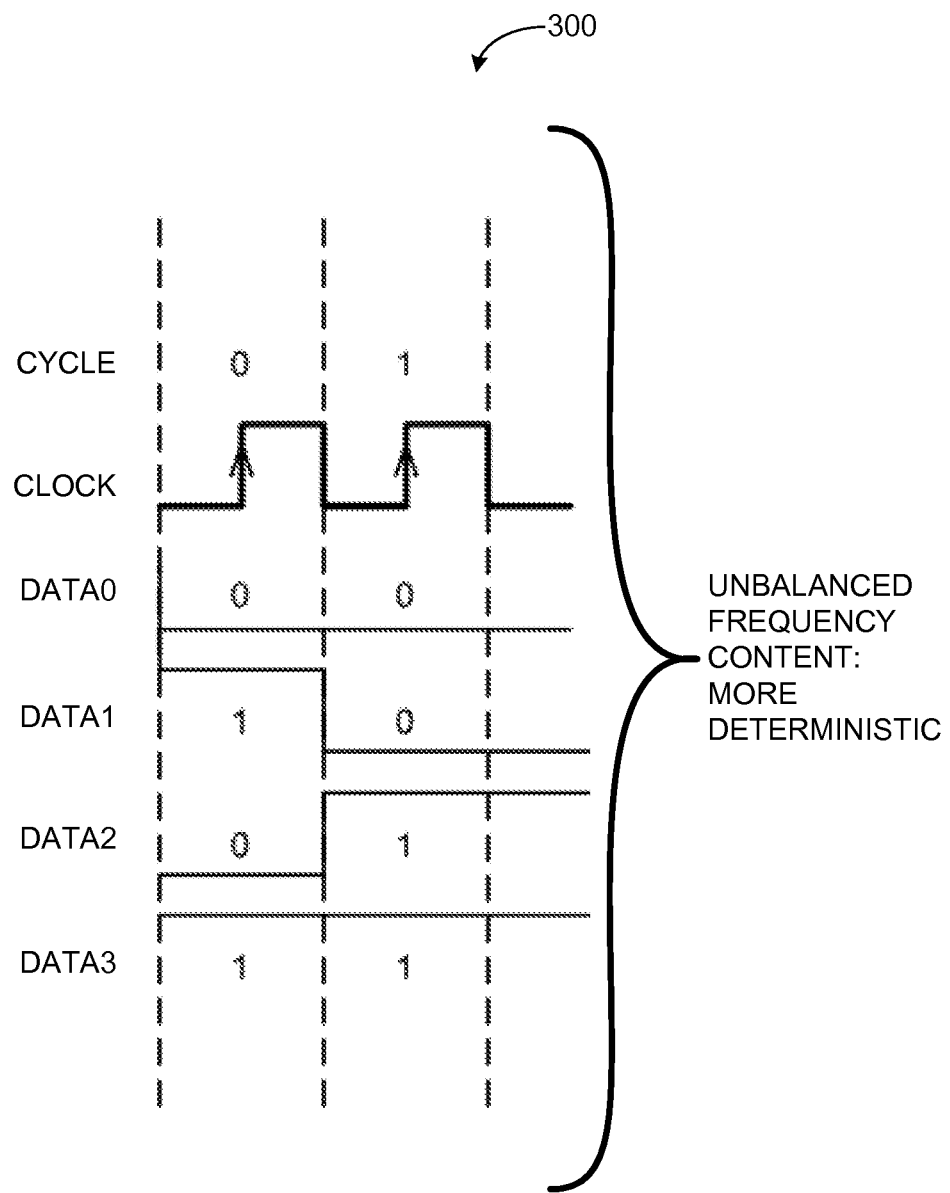
FIGS. 3 and 4 illustrate generally example clock and data line recordings of data communicated between devices.
Figure 4:
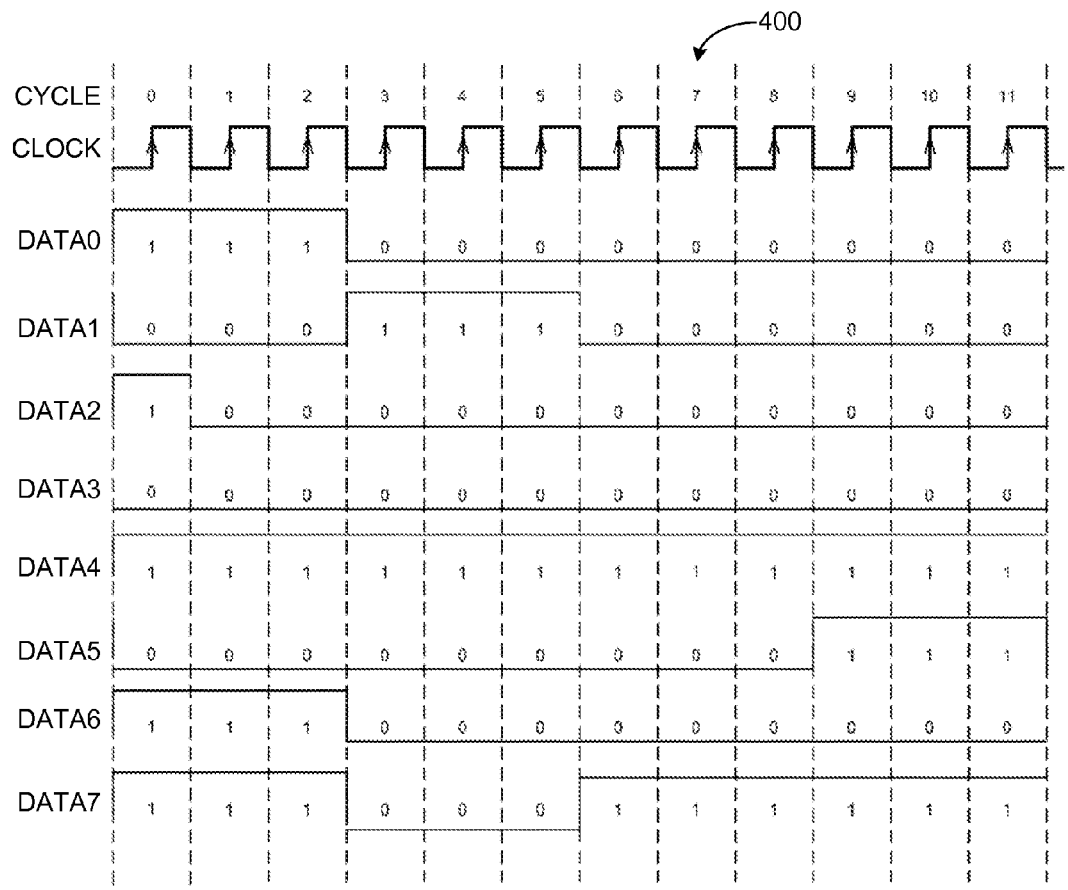

FIGS. 3 and 4 illustrate generally example clock (CLOCK) and data line (DATA0, DATA1, etc.) recordings of data communicated between devices of a circuit or electronic system. In certain examples, the data can represent a secret encryption key, stored in non-volatile memory (NVM), and used in encryption algorithms. In certain circuits and systems, read/writes to NVM storing encryption data or instructions, can generate deterministic data path patterns, which can be discriminated and correlated to known encryption algorithm events. A power or electromagnetic (EM) analysis of unbalanced frequency content can provide signatures that correlate to known encryption algorithm events, greatly reducing the number of brute force iterations necessary to derive secret encryption keys in an attack.

FIG. 3 illustrates generally example clock (CLOCK) and data line (DATA0, DATA1, DATA2, DATA3) recordings 300 for two example data communication cycles (CYCLE 0, CYCLE 1). In this example, data is read on rising clock edges, near the middle of the data communication cycles, to account for setup and hold times of rising and falling edges of data between reads. However, such data transfer and timing provides deterministic, unbalanced frequency content.

FIG. 4 illustrates generally example clock (CLOCK) and data line (DATA0, DATA1, . . . DATA7) recordings 400 for twelve example data communication cycles (CYCLE 0, CYCLE 1, . . . CYCLE 11). In this example, the length of a data communication cycle is equal to a period of the clock signal.

Figure 5:
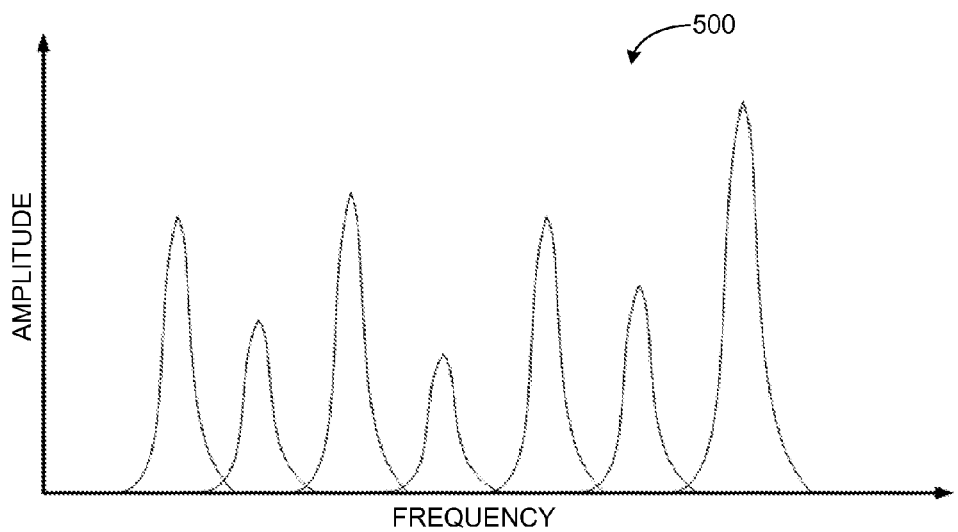
FIG. 5 illustrates generally an example frequency plot for clock and data line recordings, such as those illustrated in the example of FIG. 4.

FIG. 5 illustrates generally an example frequency plot 500 for clock and data line recordings, such as those illustrated in the example of FIG. 4. In the frequency plot 500, the highest frequency is representative of CLOCK, which switches from "0" to "1" at ever cycle. Data lines typically switch at a lower frequency. For example, DATA0 and DATA1 switch at a frequency lower than the clock signal, while DATA3 and DATA4 are static DC values. As described above with respect to FIGS. 3 and 4, this unbalanced frequency content can provide signatures that correlate to known encryption algorithm events, greatly reducing the amount of work necessary to gain unauthorized access to electronic systems employing various encryption techniques.

Figure 6:
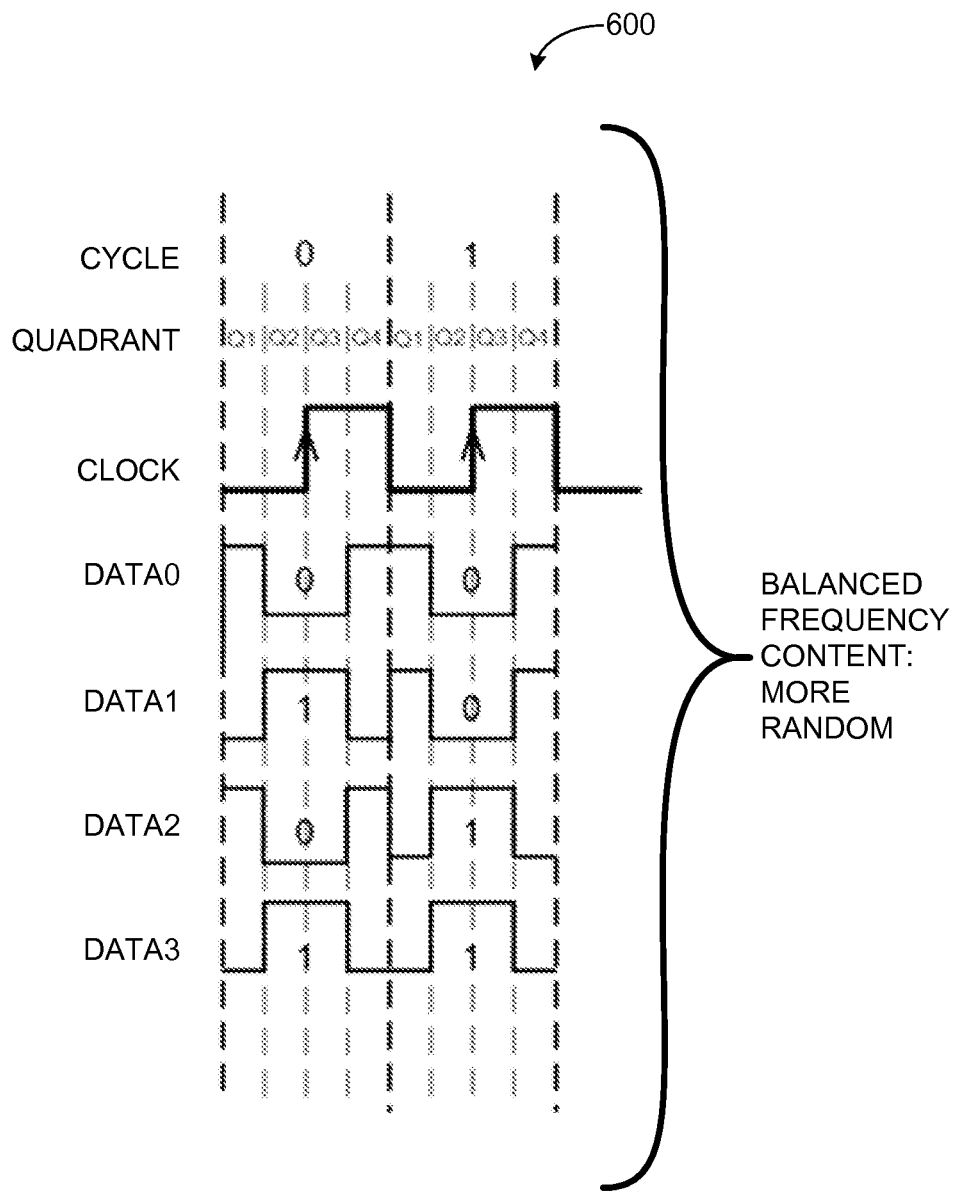
FIGS. 6 and 7 illustrate generally example clock and data line recordings, the data lines illustrating one example of complimentary bit slicing.
Figure 7:
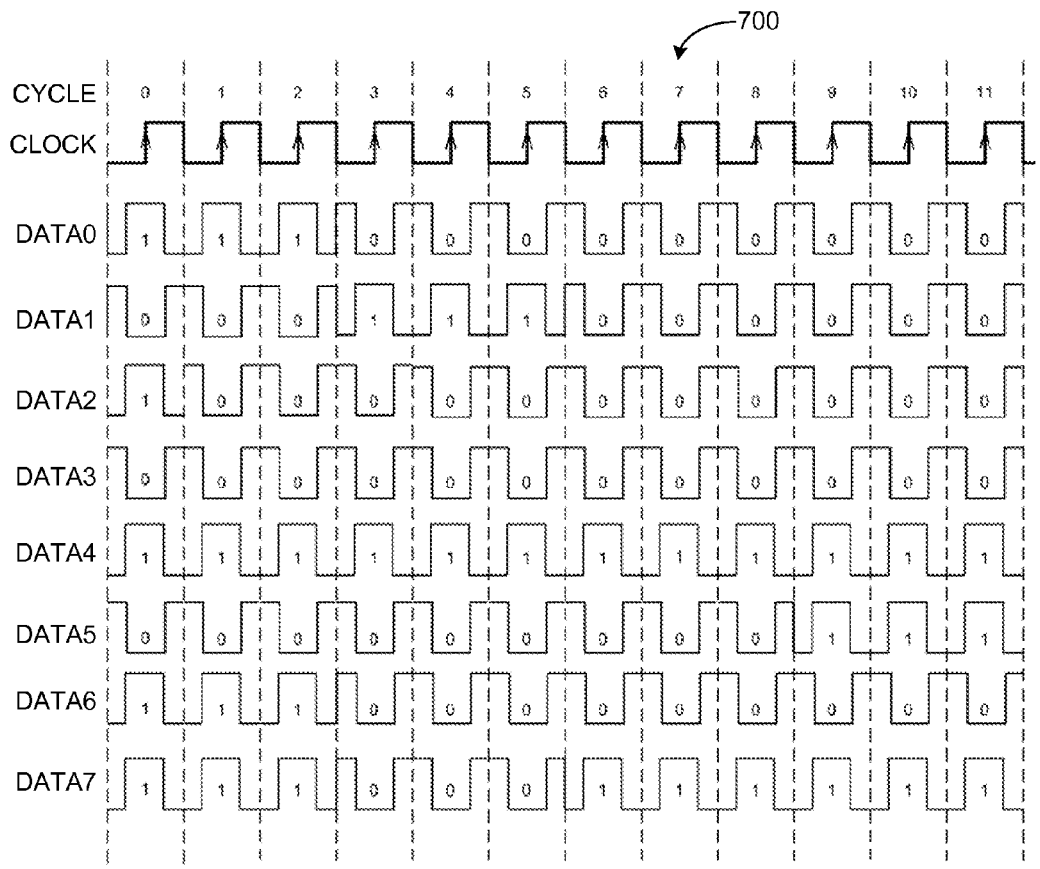

FIGS. 6 and 7 illustrate generally example clock and data line recordings, the data lines illustrating one example of complimentary bit slicing, providing a uniform power distribution to conceal the activity of a circuit or electronic system from various side-channel attacks, such as power analysis or EM analysis side-channel attacks. In an example, a data communication cycle can be broken into multiple portions, including at least one portion having the actual bit state of the data to be transferred and at least one portion having the complimentary bit state, to provide a more balanced frequency content of the data being transferred.

In certain examples, the number of portions of each data communication cycle can depend on various factors, such as clock frequency, setup and hold times, rising times, falling times, etc. In various examples, the number of portions can be as few as two or as many as ten or more. In an example, each data communication cycle can be broken into three portions of equal or varying lengths. The second, middle portion, long enough to satisfy setup and hold times required for data transfer, can contain an actual bit state of the data being communicated, with the remaining time divided, equally or unequally, between the first and third portions, which can contain a complimentary bit state. In other examples, other numbers of portions can be used.

FIG. 6 illustrates generally example clock (CLOCK) and data line (DATA0, DATA1, DATA2, DATA3) recordings 600 for two example data communication cycles (CYCLE 0, CYCLE 1), each broken into four equal-length portions (Q1, Q2, Q3, Q4). The two middle portions (Q2, Q3) can contain the actual bit state, and the two end portions (Q1, Q4) can contain the complimentary bit state. For example, in CYCLE 0 of DATA0, the data being transferred is a "0". Accordingly, Q2 and Q3 of CYCLE 0 have a bit state of "0", and Q1 and Q4 have a bit state of "1". As illustrated in FIG. 6, the first two data communication cycles (CYCLE 0, CYCLE 1) of DATA0 have a frequency equal to the clock frequency. The data on DATA1 has the frequency of the clock signal and a frequency higher than the clock signal (e.g., a frequency roughly twice that of the clock signal). In other examples, other portions of the data communication cycles can be used to transfer data (e.g., Q1-Q3, Q2-Q4, etc.).

FIG. 7 illustrates generally example clock (CLOCK) and data line (DATA0, DATA1 . . . DATA7) recordings 700 for twelve example data communication cycles (CYCLE 0, CYCLE 1 . . . CYCLE 11). As illustrated in FIGS. 6 and 7, using complimentary bit slicing, clock and data line recordings 600, 700 provide a bimodal power distribution, focused at the frequency of the clock signal and a frequency higher than the clock signal.

Figure 8:
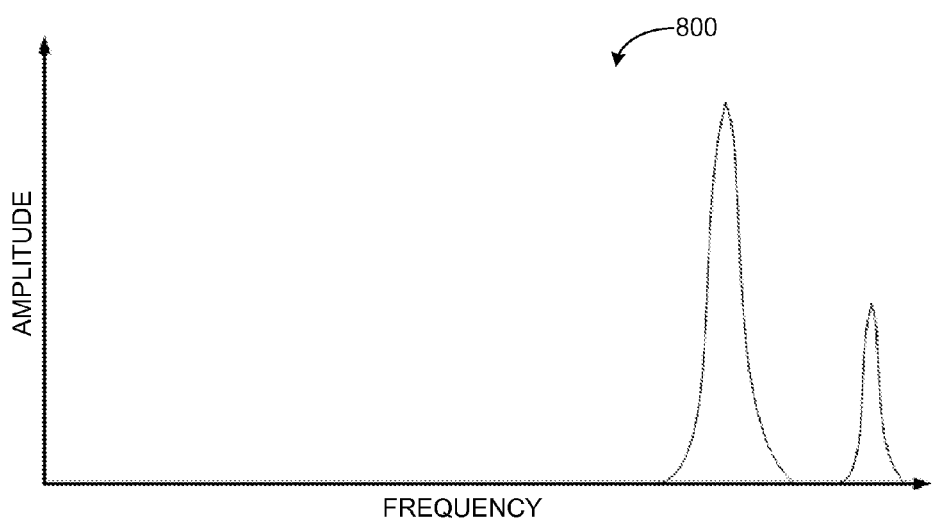
FIG. 8 illustrates generally an example frequency plot for clock and data line recordings, such as those illustrated in the example of FIG. 7.

FIG. 8 illustrates generally an example frequency plot 800 for clock and data line recordings, such as those illustrated in the example of FIG. 7. In contrast to the frequency plot 500, the frequency plot 800 has a balanced, bimodal power distribution, focused at the frequency of the clock signal and a frequency higher than the clock signal, removing signature power and EM events across the entire data bus, making it much more difficult to differentiate between known encryption algorithm events.

Additional Notes and Examples

A system or apparatus can include, or can optionally be combined with any portion or combination of any portions of any one or more of the examples or illustrations above to include, means for performing any one or more of the functions described above, or a machine-readable medium including instructions that, when performed by a machine, cause the machine to perform any one or more of the functions described above.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A complimentary bit slicing uniform power distribution communication system, comprising:
   a cryptographic engine circuit configured to communicate data over a data bus during a first period of a clock signal with a uniform power distribution;
   wherein the cryptographic circuit is configured to provide a complimentary bit state of the data during a first portion of the first period of the clock signal and to provide an actual bit state of the data during a second portion of the first period of the clock signal, the actual and complimentary bit states configured to provide a uniform power distribution in the first period of the clock signal to defend against side-channel attacks.

2. The system of claim 1, including:
   a non-volatile memory (NVM) configured to store data, wherein the cryptographic circuit is configured to communicate the data stored in the NVM over the data bus during the first period of the clock signal.

3. The system of claim 1, wherein the first and second portions of the first period of the clock signal are successive portions.

4. The system of claim 1, wherein the first and second portions of the first period of the clock signal have different lengths.

5. The system of claim 1, wherein the cryptographic engine circuit is configured to provide the complimentary bit state of the data during the, first portion of the first period of the clock signal on a first data line of the data bus and the actual bit state of the data during the second portion of the first period of the clock signal on the first data line of the data bus.

6. The system of claim 1, wherein the first period includes first, second, third, and fourth portions, wherein the cryptographic circuit is configured to provide the complimentary bit state of the data during the first and fourth portions of the first period of the clock signal and to provide the actual bit state of the data during the second and third portions of the first period of the clock signal.

7. The system of claim 6, wherein the first, second, third, and fourth portions of the first period of the clock signal are successive portions.

8. The system of claim 6, wherein the first, second, third, and fourth portions of the first period of the clock signal have equal lengths.

9. The system of claim 6, wherein the cryptographic circuit is configured to provide the complimentary bit state of the data during the first and fourth portions of the first period of the clock signal on a first data line of the data bus, and wherein the cryptographic circuit is configured to provide the actual bit state of the data during the second and third portions of the first period of the clock signal on the first data line of the data bus.

10. A method to communicate data over a data bus during a first period of a clock signal with a uniform power distribution, the first period including first and second portions, comprising:
   providing a complimentary bit state of the data during the first portion of the first period of the clock signal using a cryptographic circuit; and
   providing an actual bit state of the data during the second portion of the first period of the clock signal using the cryptographic circuit, the actual and complimentary bit states configured to provide a uniform power distribution in the first period of the clock signal to defend against side-channel attacks.

11. The method of claim 10, wherein the first and second portions of the first period of the clock signal are successive portions.

12. The method of claim 10, wherein the first and second portions of the first period of the clock signal have different lengths.

13. The method of claim 10, wherein the providing the complimentary and actual bit states include:
   providing the complimentary bit state of the data during the first portion of the first period of the clock signal on a first data line of the data bus; and
   providing the actual bit state of the data during the second portion of the first period of the clock signal on the first data line of the data bus.

14. The method of claim 10, wherein the first period includes first, second, third, and fourth portions, the method including:
   providing the complimentary bit state of the data during the first and fourth portions of the first period of the clock signal; and providing the actual bit state of the data during the second and third portions of the first period of the clock signal.

15. The method of claim 14, wherein the first, second, third, and fourth portions of the first period of the clock signal are successive portions.

16. The method of claim 14, wherein the first, second, third, and fourth portions of the first period of the clock signal have equal lengths.

17. The method of claim 14, wherein the providing the complimentary bit state and the actual bit state includes:
   providing the complimentary bit state of the data during the first and fourth portions of the first period of the clock signal on a first data line of the data bus; and
   providing the actual bit state of the data during the second and third portions of the first period of the clock signal on the first data line of the data bus.

18. A complimentary bit slicing uniform power distribution communication system, comprising:
   a cryptographic circuit configured to communicate data over a data bus, including a plurality of bit lines, during a first period of a clock signal, the first period including successive first, second, and third portions,
   wherein the cryptographic circuit is configured to provide a complimentary bit state of the data on the plurality of bit lines during the first portion of the first period of the clock signal and to provide an actual bit state of the data on the plurality of bit lines during the second portion of the first period of the clock signal, the actual and complimentary bit states configured to provide a uniform power distribution in the first period of the clock signal to defend against side-channel attacks.

19. The system of claim 18, wherein the first and second portions of the first period of the clock signal have different lengths, and wherein the cryptographic circuit is configured to provide the complimentary bit state of the data on the plurality of bit lines during the third portion of the first period of the clock signal.

20. The system of claim 18, wherein the first period of the clock signal includes a fourth portion successive with the first, second, and third portions, wherein the first, second, third, and fourth portions of the first period of the clock signal have equal lengths, and wherein the cryptographic circuit is configured to provide the complimentary bit state of the data on the plurality of bit lines during the first and fourth portions of the first period of the clock signal and to provide the actual bit state of the data on the plurality of bit lines during the second and third portion of the first period of the clock signal.

* * * * *